(No Model.)

M. W. DICKEY.
HAY FORK.

No. 435,289. Patented Aug. 26, 1890.

WITNESSES:
Paul Jobst
Wm W. Luyster

INVENTOR:
M. W. Dickey
BY Munn & Co.
ATTORNEYS.

UNITED STATES PATENT OFFICE.

MORELL W. DICKEY, OF BIG TIMBER, MONTANA.

HAY-FORK.

SPECIFICATION forming part of Letters Patent No. 435,289, dated August 26, 1890.

Application filed October 21, 1889. Serial No. 327,660. (No model.)

*To all whom it may concern:*

Be it known that I, MORELL W. DICKEY, of Big Timber, in the county of Park and Territory of Montana, have invented a new and useful Improvement in Hay-Forks, of which the following is a full, clear, and exact description.

My invention relates to an improvement in hay-forks, and has for its object to provide an implement of simple, durable, and economic construction; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
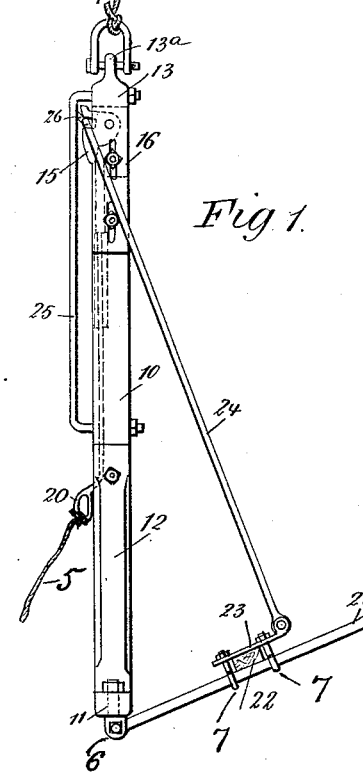
Figure 2:
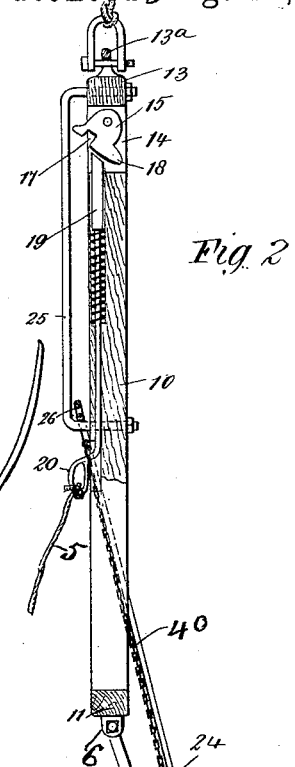

Figure 1 is a side elevation of the fork, the tines being in position for carrying. Fig. 2 is a central vertical section illustrating the tines in the dumping position, and Fig. 3 is a perspective view of the implement in position to carry the load.

Figure 3:
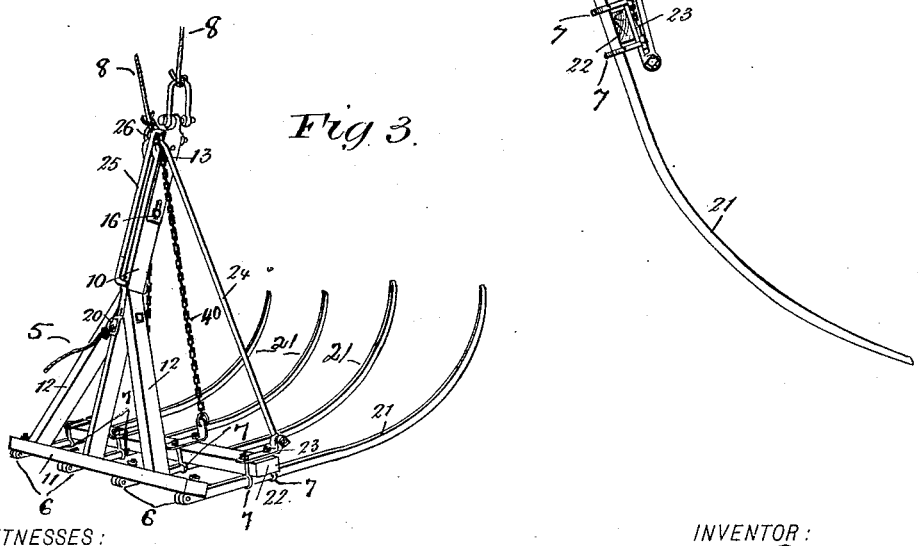

In carrying out the invention the head of the fork consists of a perpendicular standard or upright 10, attached at its base to a cross-bar 11 and provided with two or more braces 12, which braces are secured to the upright and to the cross-bar, as illustrated in Fig. 3, and a casting 13, attached to the upper end of the upright 10, which casting is capable of vertical adjustment upon the upright and provided at the upper end with an interior recess 14, as best shown in Fig. 2, in which recess a dog 15 is pivoted. The casting 13 is attached to the upright 10 through the medium of one or more bolts 16, passed through the sides of the casting and through apertures in the upright, which bolts may be withdrawn and the casting raised or lowered for a purpose hereinafter set forth. The dog 15 is provided in its outer face with a recess 17 and at its lower end with an essentially-pointed extension 18. Immediately below the dog a spring-latch 19 is held to slide in a suitable longitudinal aperture produced in the upright 10, which latch projects at its lower end beyond the outer face of the upright and is provided with a handle 20, to which a rope 5, chain, or its equivalent may be attached. The latch 19, when brought to an engagement with the inner edge of the dog-extension 18, retains the outer edge of said dog, in which the recess 17 is produced, in a perpendicular position. The tines 21 are hinged at one end to the cross-bar 11 of the head, the hinge-connection being usually effected by eyebolts 6, projecting down from the cross-bar, and a pintle passing through the tines and eyebolts, as illustrated, and the tines are further supported by attachment to a second cross-bar 22, this connection being usually effected through the medium of eye-bolts 7, secured to the tines and passing upward—one at each side of the cross-bar—the said eyebolts being connected at the top by strap-plates 23, which strap-plates are preferably bent upward at one end, as shown in Fig. 3. To the two outer strap-plates the extremities of a bail 24 are hinged, which bail is adapted to slide between the outer face of the upright 10 of the head, and a yoke 25, longitudinally attached to said upright, and the said bail at its upper end is further adapted to enter the recess 17 in the dog 15. To the the upper end of the bail a loop or eye 26 is attached, to which the hoist-rope 8 is preferably secured. The inclination of the tines is regulated by the adjustment of the casting 13 upon the fork-head.

In operation the fork is locked, as in Fig. 3, and inverted, the tines being brought to a vertical position and the head to a horizontal position in contact with the top of a stack or load of hay, and while the fork is in this position the tines are pressed straight down into the hay. Draft now being applied to the hoist-rope, brings the fork and its load to the carrying position. (Shown in Figs. 1 and 3.) To dump the load, the latch 20 is drawn downward, whereupon the dog is free to assume a diagonal position, as illustrated in Fig. 2, and the bail is free to drop from the recess of the dog, while the weight of the load forces the tines downward to the vertical position shown in Fig. 2. As soon as the hay leaves the fork, by reason of the suspension of the fork by the bail, the latter is instantly and automatically drawn up to its locked position—that is, in contact with the walls of the dog-recess.

In order to strengthen the fork, I usually attach one end of a chain 40 to each inner face of the bail at the top and secure the lower ends of said chain to the intermediate strap-plates 23. The casting 13 may be provided with an eye 13ª at its upper end for attachment to the hoist-rope. When the hoist-rope is fastened to the eye 13ª after dumping, the fork remains in the position shown in Fig. 2, and is locked by bringing the head forward to the horizontal position, the tines resting upon any convenient support.

The movement of the parts to accomplish this lock is as follows: The bail 24 is forced upward and made to contact with the walls of the recess 17 of the dog, whereupon the said dog is forced to assume a perpendicular position, and in assuming such position depresses the latch 19, which, flying upward as the extension 18 passes, contacts with the inner side of said extension, and thereby maintains the dog in such a position that its longitudinal axis will be parallel with the longitudinal axis of the head.

Having thus described my invention, I claim as new and desire to secure by Letters Patent—

1. In a hay-fork, the combination, with a head and tines pivoted thereto, of a recessed dog pivoted in the head, a bail pivoted to the tines and adapted to be engaged by the recess of the dog, and a sliding and spring-actuated latch adapted to engage the said dog, substantially as described.

2. In a hay-fork, the combination, with a head, tines hinged to said head, and a casting attached to the upper portion of the head provided with a pivoted recessed dog, of a bail pivoted to the tines capable of sliding upon the head and entering the recess of the dog, and a spring-actuated latch also capable of contact with the dog, substantially as and for the purpose specified.

3. In a hay-fork, the combination, with a head, tines pivoted to said head, a dog having a lower extension and a recess above said extension pivoted in the upper portion of the head, and a yoke attached to the head over the said dog, of a bail pivoted to the tines, the upper portion of which is capable of sliding in the said yoke and contacting with said dog, and a spring-actuated latch adapted for contact with the extension of the dog, all combined for operation substantially as and for the purpose specified.

MORELL W. DICKEY.

Witnesses:
W. W. BEASLEY,
A. M. HARRIS.